(12) United States Patent
Kita et al.

(10) Patent No.: US 7,740,124 B2
(45) Date of Patent: Jun. 22, 2010

(54) GRASPING DEVICE

(75) Inventors: Megumi Kita, Kyoto (JP); Hideki Suzutani, Osaka (JP)

(73) Assignee: Yushin Precision Equipment Co., Ltd., Kyoto (JP)

( * ) Notice: Subject to any disclaimer, the term of this patent is extended or adjusted under 35 U.S.C. 154(b) by 20 days.

(21) Appl. No.: 12/237,598

(22) Filed: Sep. 25, 2008

(65) Prior Publication Data

US 2009/0084660 A1 Apr. 2, 2009

(30) Foreign Application Priority Data

Sep. 28, 2007 (JP) .............................. 2007-255673

(51) Int. Cl.
*B65G 47/34* (2006.01)
(52) U.S. Cl. ................. 198/468.4; 198/471.1; 264/40.1
(58) Field of Classification Search ............. 198/468.4, 198/471.1, 478.1, 474.1, 803.5
See application file for complete search history.

(56) References Cited

U.S. PATENT DOCUMENTS

| | | | |
|---|---|---|---|
| 4,411,574 A * | 10/1983 | Riley | 198/432 |
| 4,571,320 A * | 2/1986 | Walker | 264/40.1 |
| 4,987,332 A | 1/1991 | Yamamoto et al. | |
| 5,681,138 A * | 10/1997 | Lust et al. | 198/468.4 |
| 6,752,581 B1 * | 6/2004 | Lust et al. | 198/468.4 |
| 2005/0178641 A1 * | 8/2005 | Yoshida et al. | 198/468.4 |

FOREIGN PATENT DOCUMENTS

| | | |
|---|---|---|
| EP | 1020259 A1 | 7/2000 |
| EP | 1685930 A1 | 8/2006 |
| EP | 2042453 A1 | 4/2009 |
| FR | 2856327 A1 | 12/2004 |
| JP | 2958989 | 7/1999 |
| JP | 2000-006074 A | 1/2000 |
| WO | WO2005/102618 A1 | 11/2005 |

OTHER PUBLICATIONS

Extended European Search Report for European Patent App. No. 08017122.6 (Nov. 26, 2008).
Communication Pursuant to Article 94(3) EPC (Jan. 18, 2010) for European Patent App. No. 08017122.6.
Response to EPO for European Patent App. No. 08017122.6 (Sep. 23, 2009).

* cited by examiner

*Primary Examiner*—James R Bidwell
(74) *Attorney, Agent, or Firm*—Cermak Nakajima LLP; Tomoko Nakajima

(57) ABSTRACT

A grasping device can be provided on a conveyor which conveys works produced by a production facility or a work subjected to in-mold forming from a work-grasping position to a work-releasing position. The example of a grasping device can include a base at the side of the conveyors and a grasping part which is extended from the base and provided with a plurality of grasping heads. The example of a grasping part can include a group of branches having a plurality of diverged and extended branches, specific branches most apart from the base each being small in weight (being light) at utmost end side.

2 Claims, 13 Drawing Sheets

GRASPING DEVICE

BACKGROUND OF THE INVENTION

1. Field of the Invention

The present invention relates to a grasping device, particularly, to a grasping device suitable for such grasping devices as that usable for grasping and taking out at a time many small molded articles or works which molded at a time by an injection molding machine, or that usable, in insert-molding technique integrally molding a thin work and synthetic resin, for grasping the thin work and inserting it into a mold in an injection molding machine.

2. Description of the Prior Art

Conventionally, in a synthetic resin molding technology, particularly, in a system of taking out molded works which system is called "a lot of articles take-out system" and grasps and takes out at a time many small molded articles molded at a time, a grasping device 50 shown in FIGS. 9, 10 and 11 is employed.

In FIGS. 9, 10 and 11, the grasping device 50 is provided for grasping and taking out at a time many small molded articles (not shown) molded (produced) at a time by an injection molding machine (a producing facility) 51. The grasping device 50 is mounted at the tip of a rotating arm 52a of a molded article take-out machine (a conveying means) 52 which conveys many small molded articles from a work-grasping position (see the solid line in FIG. 11) opposite to an opened mold 51a of an injection molding machine 51 to a work-releasing position (for example, see the two-dots chain line in FIG. 11) outside the injection molding machine 51.

The grasping device 50 is in the form of a frame in a square shape in a front view and made of a metal plate or hard synthetic resin plate having a small thickness (t). The grasping device 50 comprises a base 53 mounted to an utmost end of a rotating arm 52a, and a grasping part 54 provided extending from the base 53. The grasping part 54 consists of: an upper side part 54a and a lower side part 54b facing and being paralleled to each other; a longitudinal side part 54c which extends vertically to connect the ends at the base 53 side of the upper and the lower side parts 54a and 54b; another longitudinal side part 54d which extends vertically to connect the utmost ends of the upper and the lower side parts 54a and 54b; and a pair of longitudinal frame parts 54e each extending vertically to connect the upper and the lower side parts 54a and 54b between the longitudinal side parts 54c and 54d.

Mounted on the side parts 54a through 54d and the pair of longitudinal frame parts 54e (separately at specific predetermined positions corresponding to specific positions where many small molded articles are molded/produced by the injection molding machine 51 at a time) are many adsorbing pads 55 for grasping the many small molded articles at a time. The adsorbing pads 55 communicate with suction and air-feed pipes 57 through suction and air-feed passages 56 formed inside the side parts 54a through 54d and the pair of longitudinal frame parts 54e. And the suction and air-feed pipes 57 are connected to a suction and air-feed means (not shown) through a suction and air-feed switching valve (not shown).

With the grasping device 50 having the foregoing structure being in the state of positioned at the work-release position illustrated by the two-dots chain line in FIG. 11, the rotating arm 52a of the molded article take-out machine 52 is rotated to move the grasping device 50 to a work grasping position (as illustrated by the solid line in FIG. 11) opposing to the opened mold 51a of the injection molding machine 51. The grasping device 50 is further caused to approach the mold 51a, particularly, a movable mold 51a. Then, the suction/air-feed switching valve is switched over to cause the suction means to communicate with the suction/air-feed pipe 57, thereby causing the suction/air-feed pipe 57 and suction/air-feed passage 56 to be subject to negative pressure, so that the many small molded articles molded by the injection molding machine 51 at a time are grasped by the large number of adsorbing pads 55 at a time.

When the grasping device 50 completes adsorbing and grasping the many small molded articles, the rotating arm 52a is revolved in a reverse direction to cause the grasping device 50 to be moved to the work-release position outside the injection molding machine 51 (that position illustrated by the two-dots chain line in FIG. 11). Then, the suction/air-feed switching valve is switched over to cause the air-feed means to communicate with a plurality of the suction/air-feed pipes 57, whereby causing the suction/air-feed pipes 57 and the suction/air-feed passage 56 to have positive pressure, so that the many small molded articles are released, followed by properly collecting/gathering them.

In the meantime, a grasping device employed in a system, which system grasps a thin work and inserts it into a mold in an injection molding machine, in the "insert molding" technique integrally molding the thin work and synthetic resin, is described in Japanese Patent No. 2958989 (Patent Document 1).

As shown in FIGS. 12 and 13, the grasping device 60 described in the patent document 1 is in the shape of a rectangular frame in a front view substantially the same in form as of a thin work such as a label and is made of metal or hard synthetic resin. The grasping device 60 comprises a rectangular base 61 integrally mounted at the rear side, and a grasping part 62, the rectangular base 61 being connected at its one end to an arm 64 of a right-angle coordinate system robot (a conveying means) 63.

The grasping part 62 consists of: an upper side part 62a and a lower side part 62b facing and being paralleled to each other; a longitudinal side part 62c which extends vertically to connect the ends at the arm 64 side, i.e., the base side, of the upper and the lower side parts 62a and 62b; another longitudinal side part 62d which extends vertically to connect the utmost ends of the upper and the lower side parts 62a and 62b; and a transverse frame part 62e extending horizontally to connect the two longitudinal side parts 62c and 62d between the upper and the lower side parts 62a and 62b.

The side parts 62a through 62d and the transverse frame part 62e are provided with many vacuum holes 65 each apart at a predetermined interval to one another. The vacuum holes 65 communicate with an air chamber 66 formed at the base 61 side at a mounting interface between the base 61 and the grasping device 62. The air chamber 66 communicates with a suction/air-feed pipe 67 which is connected with a suction/air-feed means (not shown) through a suction/air-feed switching valve which not shown. An adsorbing pad 55 explained in FIG. 9 may be mounted to the respective opening of the many vacuum holes 65.

In the grasping device 60 having the above structure, the grasping device 60 is moved, by the robot 63, to an escape position of a work (label) magazine, so that the grasping part 62 is abutted against the work to be stopped. Then, the suction/air-feed switching valve is switched over to cause the suction means to communicate with the suction/air-feed pipe 67, whereby causing the suction/air-feed pipe 67, air chamber 66 and the many vacuum holes 65 to be subject to negative pressure, so that the work is adsorbed and grasped by the grasping part 62.

Next, the robot 63 causes the grasping part 62 of the grasping device 60 to approach (and stop there) a front mold (not shown) of an opened mold in an injection molding machine (not shown). Then, the suction/air-feed switching valve is switched over to cause the air-feed means to communicate with the plurality of the suction/air-feed pipes 67, whereby causing the suction/air-feed pipes 67, air chamber 66 and the many vacuum holes 65 to be subject to positive pressure, so that the work is released and inserted into the front mold.

In the meantime, the grasping device 50, which grasps at a time the many small molded articles as explained in FIGS. 9, 10 and 11, is moved from the work-release position illustrated by two-dots chain line in FIG. 11 to the work-grasping position illustrated by solid line, so that due to inertia occurring there upon stoppage of the grasping device 50 the grasping part 54 of the grasping device 50 has vibration mainly in the direction of thickness (t). The vibration in the thickness (t) direction is concluded to be magnified due to a larger weight of the grasping part's utmost end side most away from the base 53 since the grasping part 54 is provided at its utmost end with the second longitudinal side part 54*d*.

When the grasping part 54 vibrates in the thickness (t) direction in this way, the precise adsorbing and grasping the many small molded articles by the many adsorbing pads 55, in other words, an accurate adsorbing and grasping of the molded articles by the grasping part 54, is spoiled, deteriorating precision of grasping of the molded articles by the grasping device 50. Hence, it is necessary to refrain from grasping the small molded articles during the time interval from the stoppage of the grasping device 50 at the work-grasping position to decay and disappearance of the vibration in order to avoid lowering of precision in grasping the molded articles. As a result, a cycle time of grasping the molded articles by the grasping device 50 is inevitably longer, which causes lowering of an efficiency of molding by the injection molding machine.

Meanwhile, the grasping device 60 explained in FIGS. 12 and 13, which grasps a thin work and inserts it into the mold in the injection molding machine, does have vibration mainly in the direction of thickness due to inertia arising when the grasping device 60 is moved to an escape position of a work (label) magazine by means of the robot 63 to cause the grasping part 62 to abut against the work and stop there, and also due to inertia occurring when the grasping part 62 of the grasping device 60 is caused, by the robot 63, to approach (and stop there) the front mold of the opened mold in the injection molding machine. The vibration in the thickness direction is concluded to be magnified due to a larger weight of the grasping part's utmost end side most away from the one longitudinal side part 62*c*, i.e., an end of the base side since the grasping part 62 is provided at its utmost end with the other longitudinal side part 62*d*.

When the grasping part 60 vibrates in the thickness direction in this way, the precise adsorbing and grasping of the work by the many vacuum holes 65 is spoiled, deteriorating precision of grasping of the work by the grasping device 60 and also lowering precision of inserting of the work. Hence, it is necessary to refrain from grasping the work during the time interval from the stoppage of the grasping device 60 at the escape position of the work (label) magazine to the decay and disappearance of the vibration in order to avoid lowering of precision in grasping the work. Besides, it is necessary to refrain from releasing the work during the time interval from the approaching and stoppage of the grasping part 62 of the grasping device 60 with respect to the front mold to the decay and disappearance of the vibration in order to avoid lowering of precision of inserting the work. As a result, a cycle time of inserting the work by the grasping device 60 is inevitably longer, which causes lowering of an efficiency of forming by an in-mold forming machine.

SUMMARY OF THE INVENTION

The present invention has been designed under those circumstances.

An object of the present invention is to provide a grasping device wherein vibration of the grasping device due to inertia arising upon stoppage after being moved is restrained to shorten time to elapse until disappearance of the vibration, whereby contributing to improvement of production efficiency of a production facility.

A grasping device according to a first invention to achieve the above-said object is a grasping device provided on a conveying means which conveys works produced by a producing facility from a work-grasping position to a work-releasing position, wherein the grasping device comprises a base at the side of the conveying means and a grasping part which is extended from the base and provided with a plurality of grasping heads, the grasping part consisting of a group of branches having a plurality of diverged and extended branches.

According to the grasping device of the first invention structured as above, since the grasping part is structured with the group of branches having a plurality of branches diverged and extended from the base, the grasping part's utmost end side most away from the base is small in weight (i.e., to be light). Thus, vibration of the grasping device due to inertia arising upon stoppage of the grasping device after being moved is restrained to shorten time to elapse until disappearance of the vibration, whereby contributing to improvement of production efficiency of a production facility.

The grasping device according to the present invention is so structured in the grasping device of the first invention that cross-sectional areas of each branch forming the group of branches become smaller sequentially from the base side to the extended ends.

According to the grasping device, since the grasping part's utmost end side most away from the base is further smaller in weight (i.e., to be lighter), vibration of the grasping device due to inertia arising upon stoppage of the grasping device after being moved is further restrained to thereby more shorten the time to elapse until disappearance of the vibration.

A grasping device of the second invention according to the present invention is a grasping device provided on a conveying means which conveys works produced by a producing facility from a work-grasping position to a work-releasing position, wherein the grasping device comprises a base at the side of the conveying means and a grasping part which is extended from the base and provided with a grasping head, and specific cross sectional areas of the grasping part become smaller sequentially from the side of the base to the extended end.

According to the grasping device also, since the grasping part's utmost end side most away from the base is small in weight (i.e., to be light), vibration of the grasping device due to inertia arising upon stoppage of the grasping device after being moved is restrained to shorten time to elapse until disappearance of the vibration.

DETAILED DESCRIPTION OF THE PREFERRED EMBODIMENT

Figure 1:
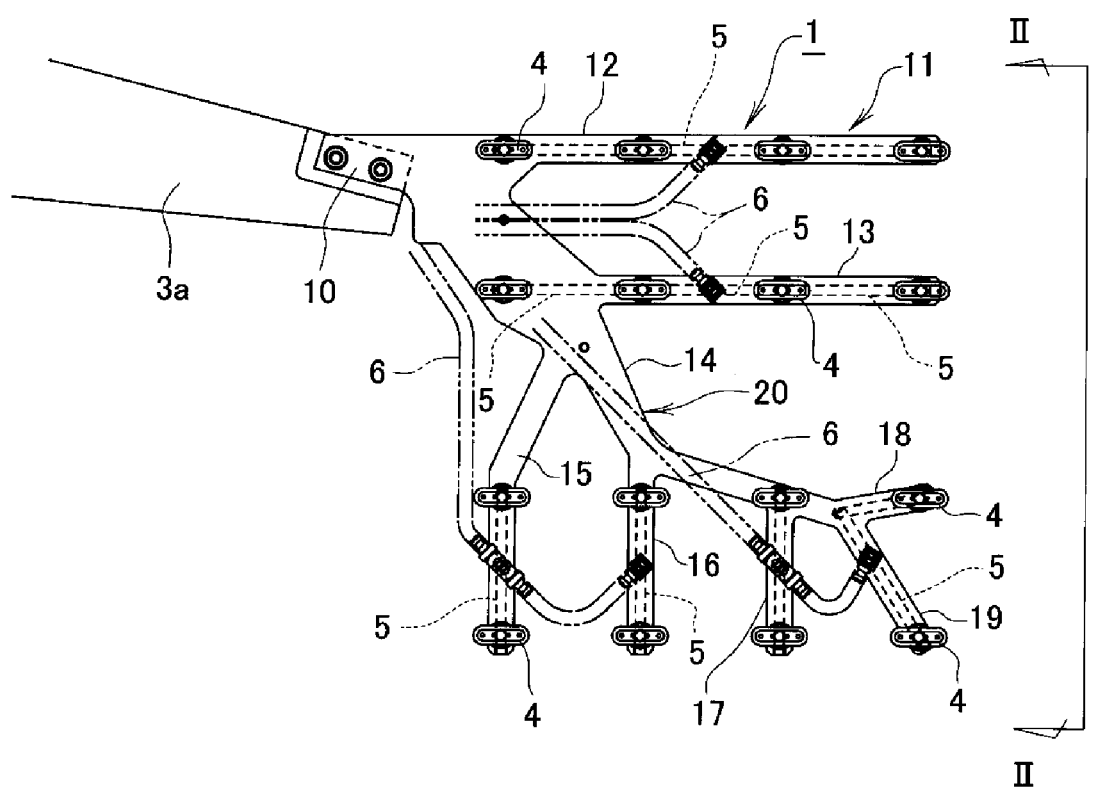
FIG. 1 is a front view showing a grasping device according to the first invention of the present invention in a first Example.
Figure 2:
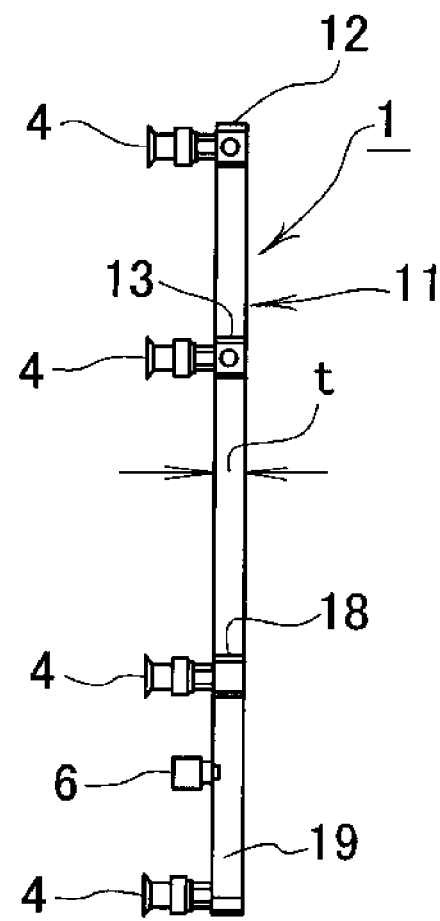
FIG. 2 is a side view taken from the arrowed line II-II in FIG. 1.

FIG. 1 is a front view showing a grasping device according to the first invention of the present invention in a first Example. FIG. 2 is a side view taken from the arrowed line II-II in FIG. 1. And FIG. 3 is a front view showing an example of use of the grasping device shown in FIG. 1.

Figure 3:
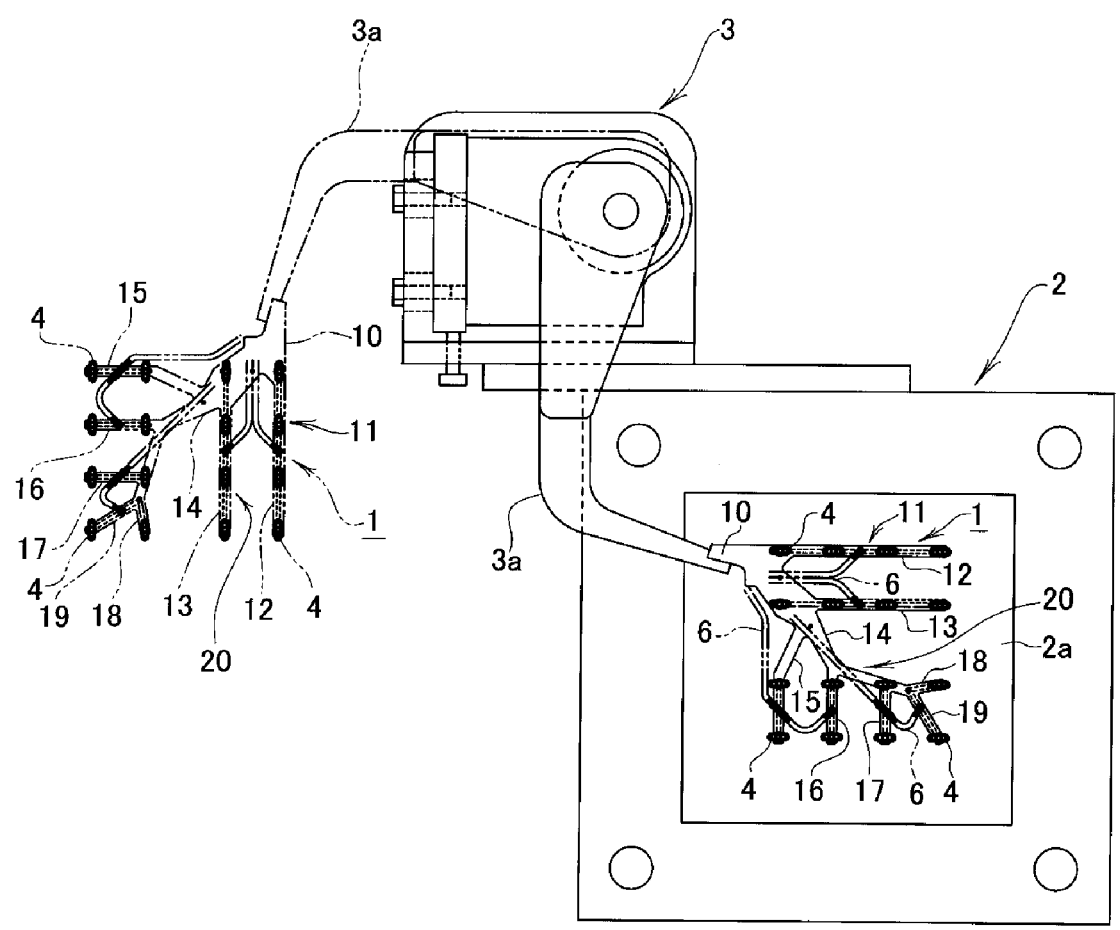
FIG. 3 is a front view showing an example of use of the grasping device shown in FIG. 1.

In FIGS. 1, 2, and 3, a grasping device 1 is provided for grasping and taking out at a time sixteen (16) small molded articles ("work(s)" (not shown)) molded (produced) simultaneously by an injection molding machine (a production facility) 2. The grasping device 1 is mounted to an utmost end of a rotating arm 3a of a molded article take-out machine (a conveying means) 3 which conveys the sixteen small molded articles from a "work grasping position" (see the solid line in FIG. 3) facing an opened mold 2a in an injection molding machine 2 to a "work-release position" (two-dots chain line in FIG. 3) outside the injection molding machine 2.

The grasping device 1 is made of a metal plate or a hard synthetic resin plate having a small thickness (t). The grasping device 1 comprises a base 10 mounted to an utmost end of a rotating arm 3a, and a grasping part 11 provided extending from the base 10. The grasping part 11 is formed with a group of branches 20 consisting of: a first through third branches 12, 13, 14 diverged and extended into three routes from the base 10; a fourth through sixth branches 15, 16, 17 further diverged and extended from the third branch 14; and a seventh and eighth branches 18, 19 diverged and extended into two routes from the utmost end of the third branch 14. Cross-sectional shapes of the branches 12-19 are set to be rectangular.

Mounted to the first through eighth branches 12-19 forming the branches group 20 are sixteen (16) adsorbing pads 4 which are formed separately at predetermined positions corresponding to sixteen molding positions for sixteen small molded articles molded at a time by an injection molding machine 2, and grasp the sixteen small molded articles at a time. The adsorbing pads 4 communicate, through a suction/air-feed passage 5 provided inside the first through eighth branches 12-19, with a suction/air-feed pipe 6 which pipe 6 is connected to a suction/air-feed means (not shown) through a suction/air-feed switching valve not shown.

In the state that the grasping device 1 structured as above-mentioned is positioned at the work-release position illustrated with the two-dots chain line in FIG. 3, the rotating arm 3a of the molded article take-out machine 3 is rotated to move the grasping device 1 to the position illustrated by the solid line in FIG. 3, namely, the work-grasping position facing the opened mold 2a in the injection molding machine 2. Furthermore, the grasping device 1 is caused to approach the mold 2a, particularly, a movable half of mold 2a, and the suction/air-feed switching valve is then switched over to cause the suction means to communicate with the suction/air-feed pipe 6, so that the suction/air-feed pipe 6 and the suction/air-feed passage 5 are subject to negative pressure, thereby enabling the sixteen small molded articles (molded at a time by the injection molding machine 2) to be grasped at a time by the sixteen adsorbing pads 4.

Upon completion of adsorbing and grasping of the sixteen small molded articles by the grasping device 1, the rotating arm 3a is turned in the reverse direction to move the grasping device 1 to the position illustrated with the two-dots chain line in FIG. 3, minutely, to a work-release position outside the injection molding machine 2. Then, the suction/air-feed switching valve is switched over to cause the air-feed means to communicate with the suction/air-feed pipe 6, so that the suction/air-feed pipe 6 and suction/air-feed passage 5 is subject to positive pressure, thereby enabling the sixteen small molded articles to be released, followed by collecting them in a proper manner.

The grasping part 11 of the grasping device 1 is structured with the branches group 20 consisting of: a first through third branches 12, 13, 14 diverged and extended into three routes from the base 10; a fourth through sixth branches 15, 16, 17 further diverged and extended from the third branch 14; and a seventh and eighth branches 18, 19 diverged and extended into two routes from the utmost end of the third branch 14. Thus, the grasping part's utmost end side most away from the base 10 (particularly, the utmost end side of each of the first through eighth branches 12-19) is small in weight (i.e., to be light). Hence, vibration of the grasping device 1 mainly in the thickness (t) direction due to inertia arising upon stoppage of the grasping device 1 after being moved from the work-release position (two-dots chain line in FIG. 3) to the work-grasping position (solid line in FIG. 3) is restrained to shorten time to elapse until disappearance of the vibration, whereby contributing to improvement of molding efficiency (production efficiency) for small molded articles by the injection molding machine 2.

In the grasping device 1 according to the present invention, the rectangular cross-sectional areas of the first through eighth branches 12-19 forming the branches group 20 are set to become smaller from the base 10 side to the utmost ends of the branches 12-19, so that the utmost end side of each of the first through eighth branches 12-19 most away from the base 10 can be further smaller in weight (i.e., to be lighter). By this, vibration of the grasping device 1 due to inertia arising upon stoppage of the grasping device 1 after being moved is further restrained to further shorten time to elapse until disappearance of the vibration. Sequential lessening of the cross-sectional areas of each branch 12-19 from the base 10 side to the utmost ends side of the branches 12-19 can be realized by setting at least one between thickness (t) and width size of the branches 12-19 to be made smaller sequentially from the base 10 side to the utmost ends of branches 12-19.

In the grasping device 1, specific routes and shapes of divergence of the branches diverged and extended from the base 10 to form the branches group 20 may be freely set correspondingly to the number of small molded articles molded at a time by the injection molding machine 2 and also to specific positions for molding the articles. Adsorbing pads 4 in the same number as of the number of the small molded articles molded at a time may be provided at predetermined positions on the branches which have the freely set routes and shapes of divergence.

Figure 4:
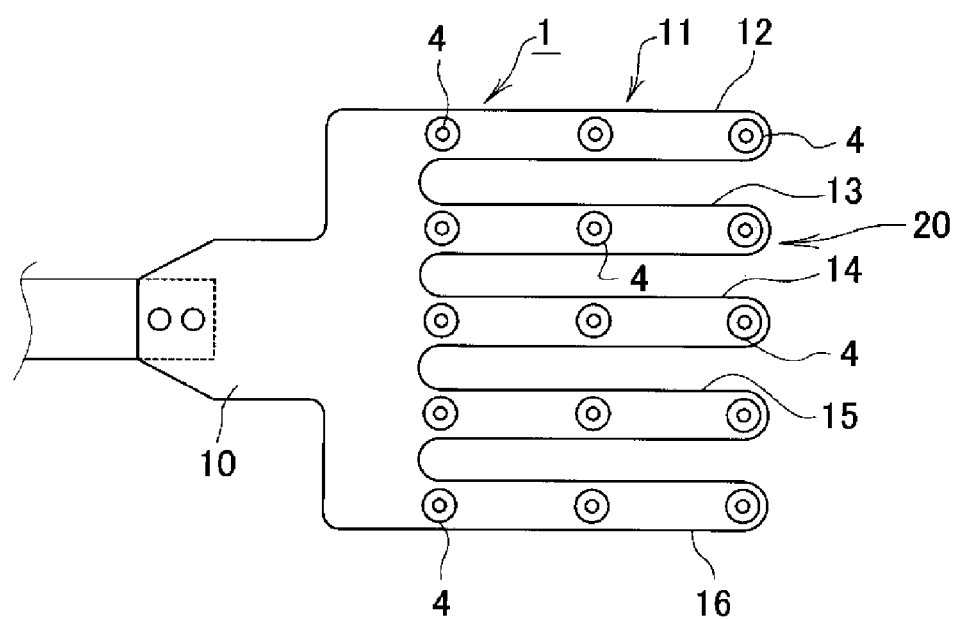
FIG. 4 is a front view showing a grasping device according to the first invention of the present invention in a second Example.

FIG. 4 shows the second Example of the grasping device 1. In FIG. 4, the same reference numeral(s) are put for the same parts as of those shown in the first Example of the grasping device 1 in FIG. 1. In FIG. 4, the grasping part 11 of the grasping device 1 comprises a group of branches 20 in shape of a rake, consisting of a first through fifth branches 12-16 diverged and extended from the base 10 into five routes. According to the grasping device 1 provided in this manner also, the grasping part's utmost end side most away from the base 10 (particularly, the utmost end side of each of the first through fifth branches 12-16) is small in weight (i.e., to be light). Hence, vibration of the grasping device 1 mainly in the thickness direction due to inertia arising upon stoppage of the grasping device 1 after being moved from the work-release position (two-dots chain line in FIG. 3) to the work-grasping position (solid line in FIG. 3) is restrained to shorten time to elapse until disappearance of the vibration, whereby contributing to improvement of molding efficiency (production efficiency) for small molded articles by the injection molding machine 2.

Figure 5:
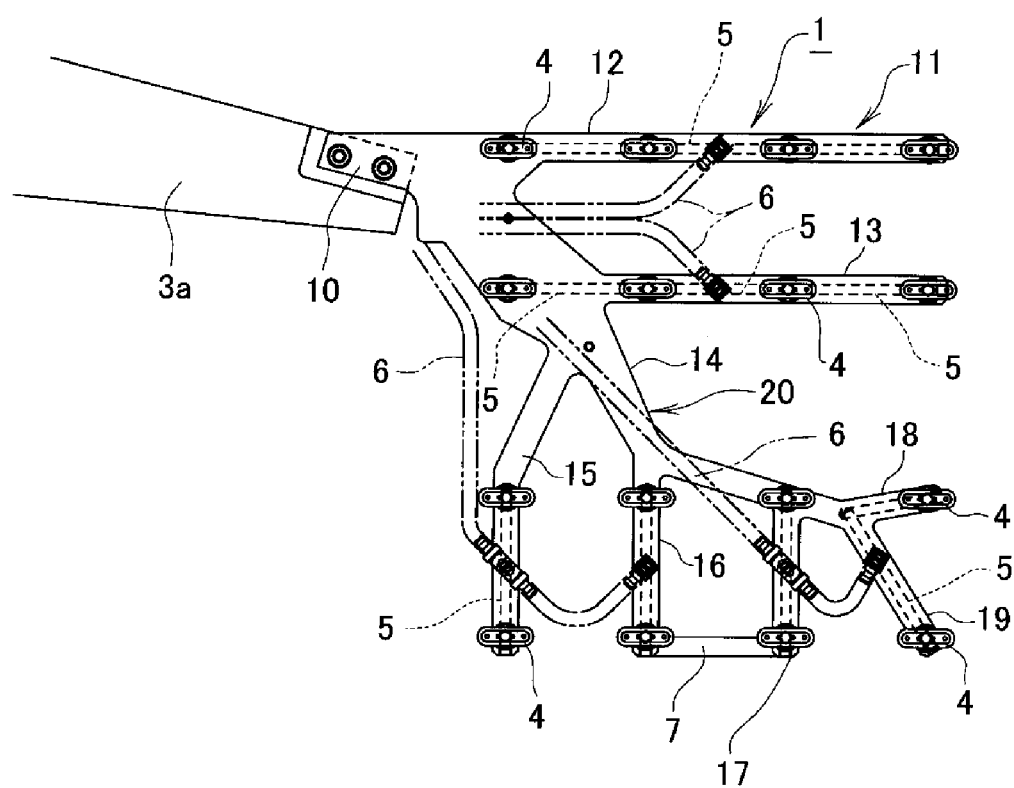
FIG. 5 is a front view showing a grasping device according to the first invention of the present invention in a modified first Example.
Figure 6:
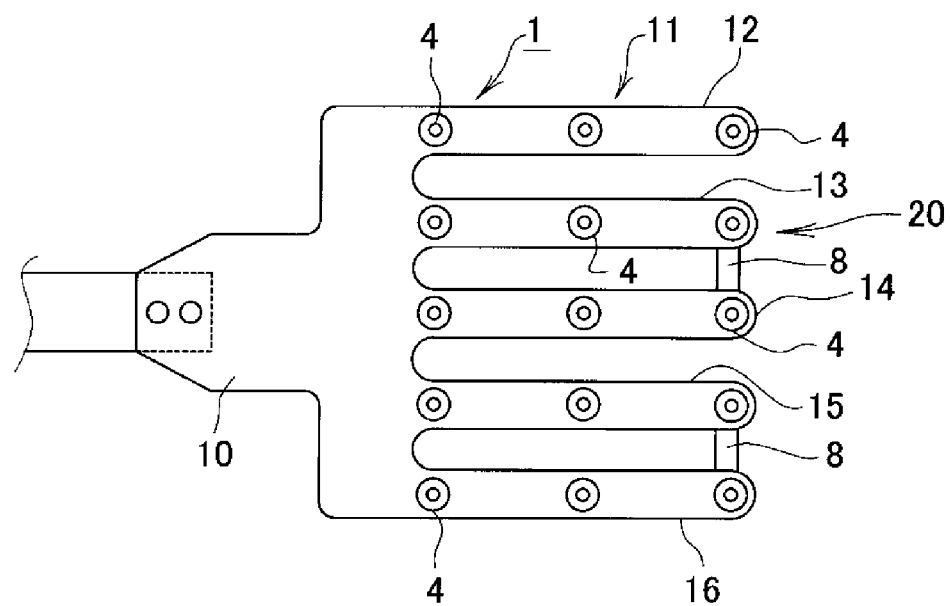
FIG. 6 is a front view showing a grasping device according to the first invention of the present invention in a modified second Example.

The grasping device 1 of the first Example referred to in FIG. 1 may be so modified that the utmost ends, for example, of the fifth branch 16 and the sixth branch 17 are connected by means of a transverse frame element 7 as shown in FIG. 5. And the grasping device 1 of the second Example referred to in FIG. 4 may be so modified that the utmost ends of the second branch 13 and the third branch 14, and those of the fourth branch 15 and the fifth branch 16 are respectively connected by means of a vertical frame element 8 as shown in FIG. 6.

As foregoing, in the grasping device 1 in the first Example, the utmost ends, for example, of the fifth branch 16 and the sixth branch 17 are connected by means of the transverse frame element 7. And in the grasping device 1 in the second Example, the utmost ends, for example, of the second branch 13 and the third branch 14 are connected by means of the vertical frame element 8, and those of the fourth branch 15 and the fifth branch 16 being connected with the element 8. Even using the frame elements 7 and 8 for the above-mentioned connecting, the transverse frame element 7 and the vertical frame element 8 themselves are small in weight. Thus, these frame elements 7 and 8 do not at all influence upon increment of weight of the extended ends of the grasping part 11, whereby, the same functional effects as of the foregoing first and second Examples can be shown. Also, the grasping part 11 can be provided with high effect of reinforcement by the transverse and the vertical frame elements 7 and 8.

Figure 7:
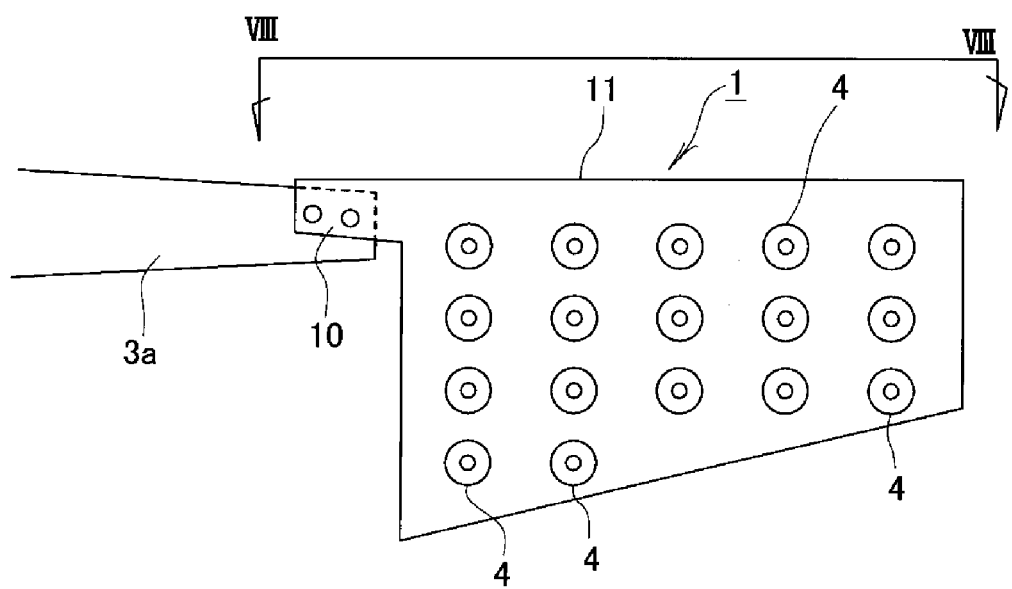
FIG. 7 is a front view showing a grasping device according to a second invention of the present invention in an Example.
Figure 8:
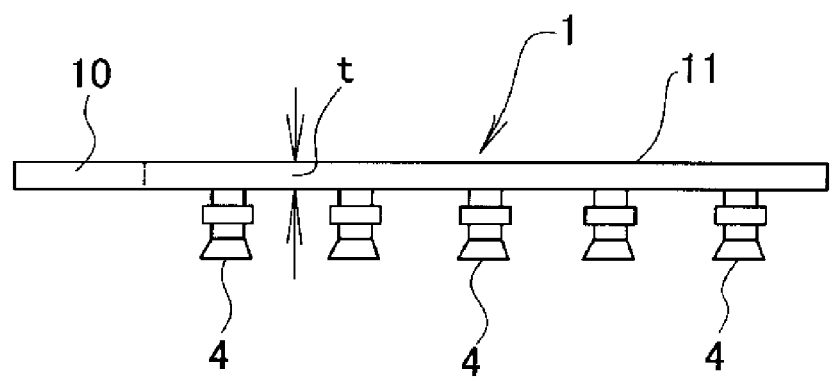
FIG. 8 is a top view taken from the arrowed line VIII-VIII in FIG. 7.
Figure 9:
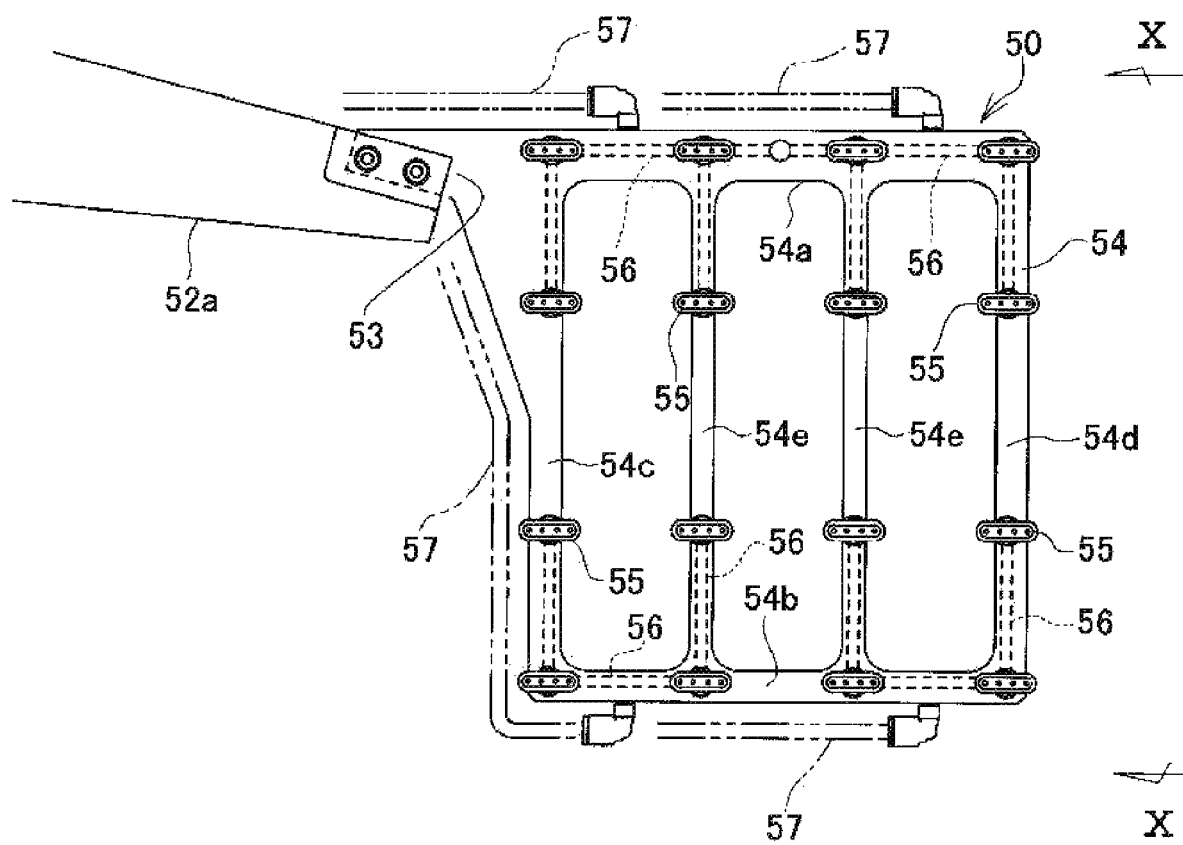
FIG. 9 is a front view showing an example of a conventional type of grasping device.
Figure 10:
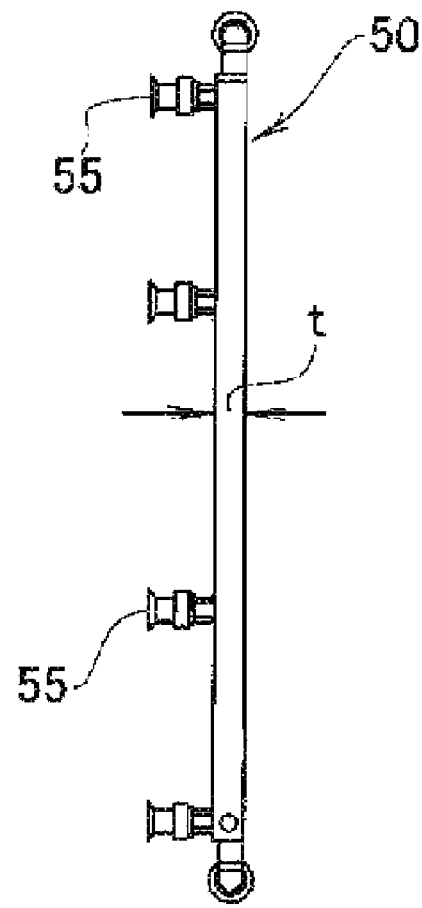
FIG. 10 is a side view taken from the arrowed line X-X in FIG. 9.
Figure 11:
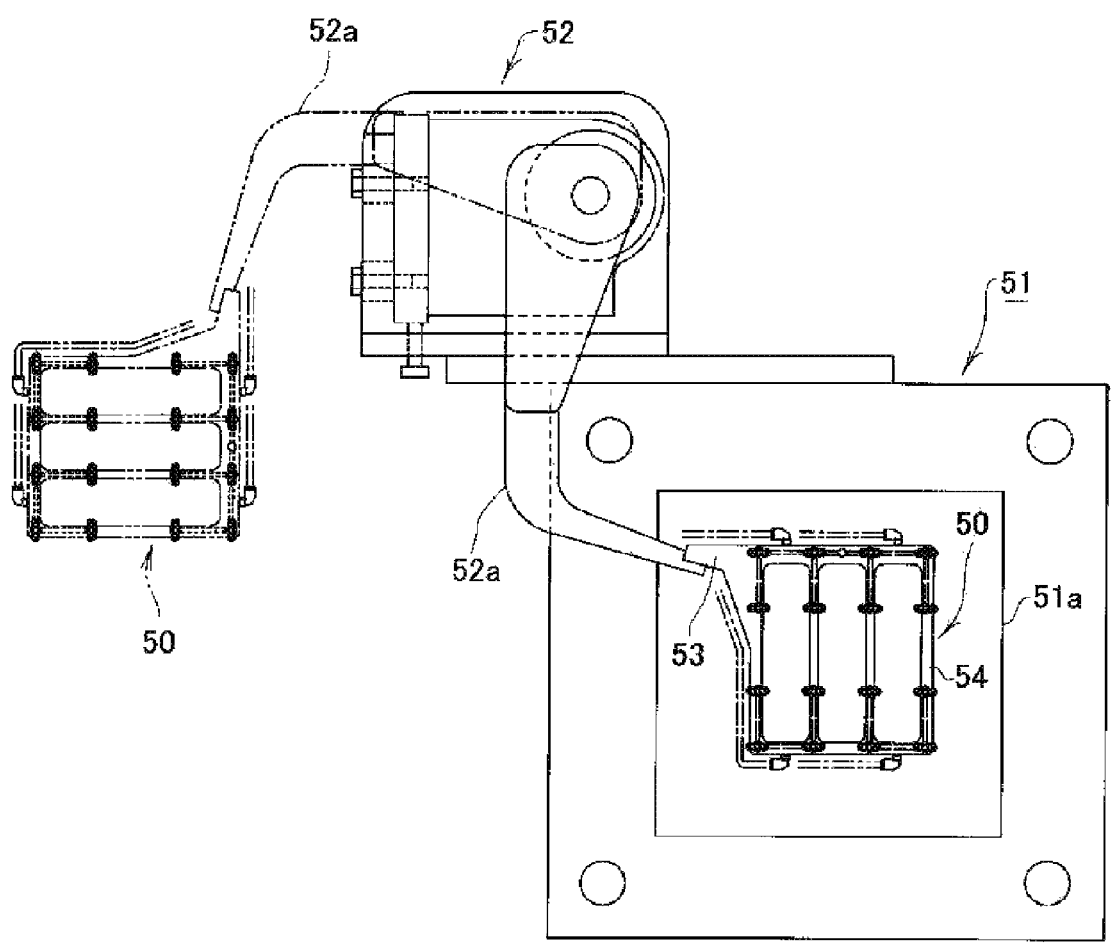
FIG. 11 is a front view showing an example of use of the grasping device shown in FIG. 9.
Figure 12:
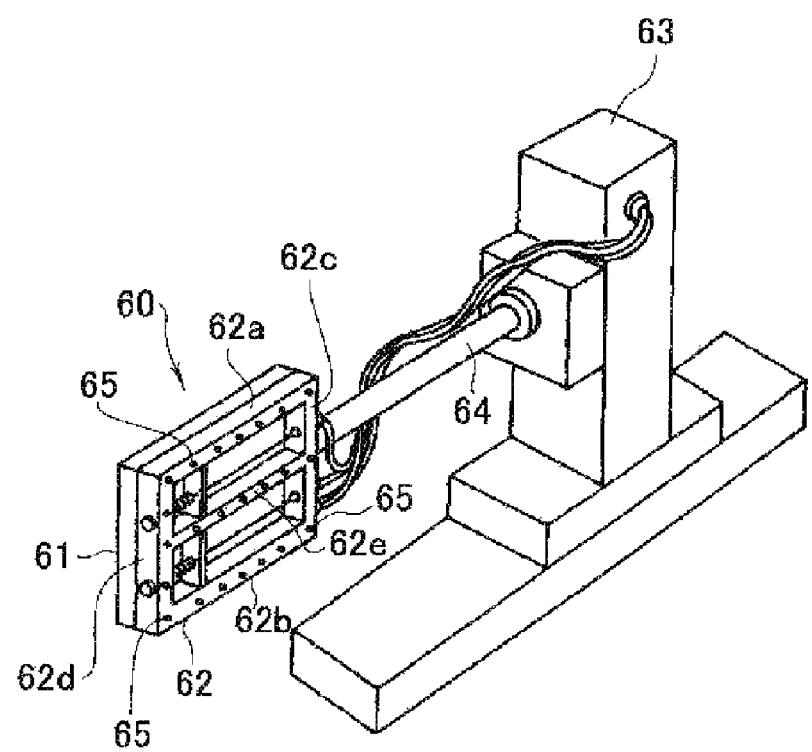
FIG. 12 is a perspective view showing an example of use of other conventional type of grasping device.
Figure 13:
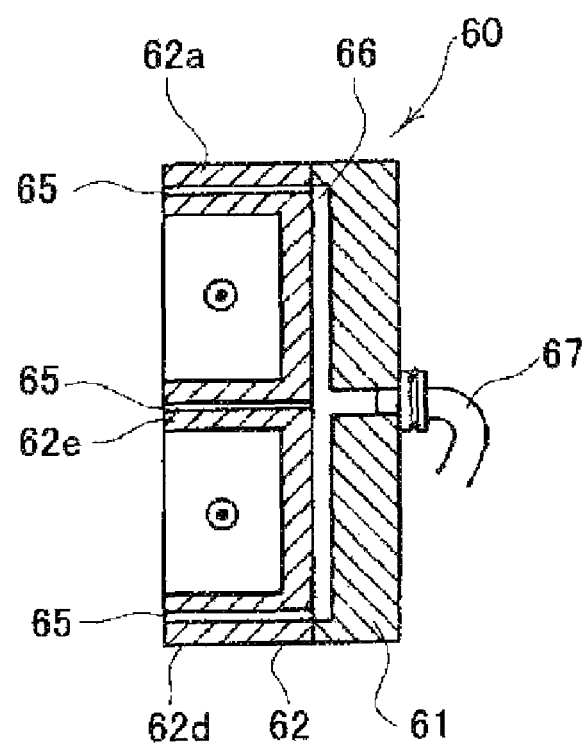
FIG. 13 is an enlarged longitudinal sectional view of the conventional grasping device shown in FIG. 12.

FIG. 7 is a front view showing a grasping device according to a second invention of the present invention in an Example. And FIG. 8 is a top view taken from the arrowed line VIII-VIII in FIG. 7. In the drawings, the same reference numeral(s) are put for the same parts as of or any corresponding parts to those shown in the grasping device 1 according to the foregoing first invention.

In FIGS. 7 and 8, the grasping device 1 according to the second invention is provided for grasping and taking out at a time seventeen (17) small molded articles ("work(s)" (not shown)) molded (produced) at a time, for example, by an injection molding machine (a producing facility) 2 in FIG. 3. Similarly to the grasping device 1 according to the first invention, the grasping device 1 according to the second invention is mounted to the utmost end of the rotating arm 3a of the molded article take-out machine (a conveying means) 3 shown in FIG. 3 which conveys the seventeen small molded articles from a "work grasping position" (see the solid line in FIG. 3) facing an opened mold 2a in an injection molding machine 2 to a "work-release position" (two-dots chain line in FIG. 3) outside the injection molding machine 2. The grasping device 1 according to the second invention is provided with a suction/air-feed passage 5 and a suction/air-feed pipe 6 (see FIG. 1 for these parts) similarly to the grasping device 1 according to the first invention but those parts are not shown.

The grasping device 1 shown in FIGS. 7 and 8 is made of a metal plate or a hard synthetic resin plate having a small thickness (t) and is in a shape of tapered knife in the front view (or in the form of a frame in a shape of tapered knife). The grasping device 1 comprises a base 10 mounted to an utmost end of the rotating arm 3a in FIG. 3, and a grasping part 11 provided extending from the base 10. Since the grasping part 11 is in the shape of a tapered knife in the front view, in other words, the cross-sectional areas of the grasping part 11 become smaller sequentially from the base 10 side to the utmost end of the grasping part 11, the utmost end side most away from the base 10 is small in weight (to be light). By this, vibration due to inertia arising upon stoppage of the grasping device 1 after being moved is restrained, so that time to elapse until disappearance of vibration is shortened. Lessening of the cross-sectional areas of the grasping part 11 from the base 10 side to the utmost end can be realized by providing the shape of tapered knife as shown in FIG. 7, or, by setting thickness (t) of the grasping part 11 to become smaller sequentially from the base 10 side to the utmost end.

In the first and second Examples of the first invention, and the Example of the second invention, the grasping device 1 has been explained as that for grasping and taking out at a time the many small molded articles molded at a time by the injection molding machine 2. Otherwise, the grasping device 1 is applicable to a grasping device 1 which grasps a thin work and inserts it into a mold in an injection molding machine 2 in the insert molding technique for integrally molding the thin work and synthetic resin.

Explained in the foregoing Examples is the structure that the grasping device 1 is mounted to the molded articles take-out machine (a conveying means) 3 provided in the form of a rotating arm and with the rotating arm 3a. The grasping device 1 may be mounted to a side-entry type of the molded articles take-out machine (a conveying means) 3.

Moreover, in the first and second Examples of the first invention, the shape of the cross-section of the branches 12-19 is set to be rectangular. But, the shape of the cross-section of the branches 12-19 should not be limited to be rectangular and may employ to be circular, rectangular, elliptic, etc, freely.

In the foregoing Examples, the structure that the adsorbing pads 4 are mounted to predetermined positions on the grasping part 11 is explained. Instead of the adsorbing pads 4, such sandwiching heads may be mounted as being capable of sandwiching the molded articles molded by the injection molding machine. In the structure with the sandwiching heads being mounted, the suction/air-feed passage 5 and the suction/air-feed pipe 6 are connected to the suction/air-feed means (not shown) through the suction/air-feed switching valve so as to serve or function as a suction/air-feed route for air for actuating opening and closing of the sandwiching heads.

What is claimed is:

1. A grasping device provided on a conveyor which conveys works produced by a production facility from a work-grasping position to a work-releasing position,
wherein the grasping device comprises a base at the side of the conveyors and a grasping part which extends from the base and provided with a plurality of grasping heads, the grasping part comprising a group of branches having a plurality of diverged and extended branches, and
wherein specific cross sectional areas of each branch comprising the group of branches become smaller sequentially from the side of the base to the extended end.

2. A grasping device provided on a conveyor which conveys works produced by a production facility from a work-grasping position to a work-releasing position, wherein the grasping device comprises a base at the side of the conveyor and a grasping part which includes a number of primary branches extending from the base,
at least one of the primary branches has a plurality of secondary branches,
at least one of the secondary branches has a plurality of third branches extending away from the secondary branches and at least one of the third branches terminates at an end.

* * * * *